L. K. FREEMAN.
BALE FORMING MACHINE.
APPLICATION FILED FEB. 1, 1917.
1,277,302.
Patented Aug. 27, 1918.
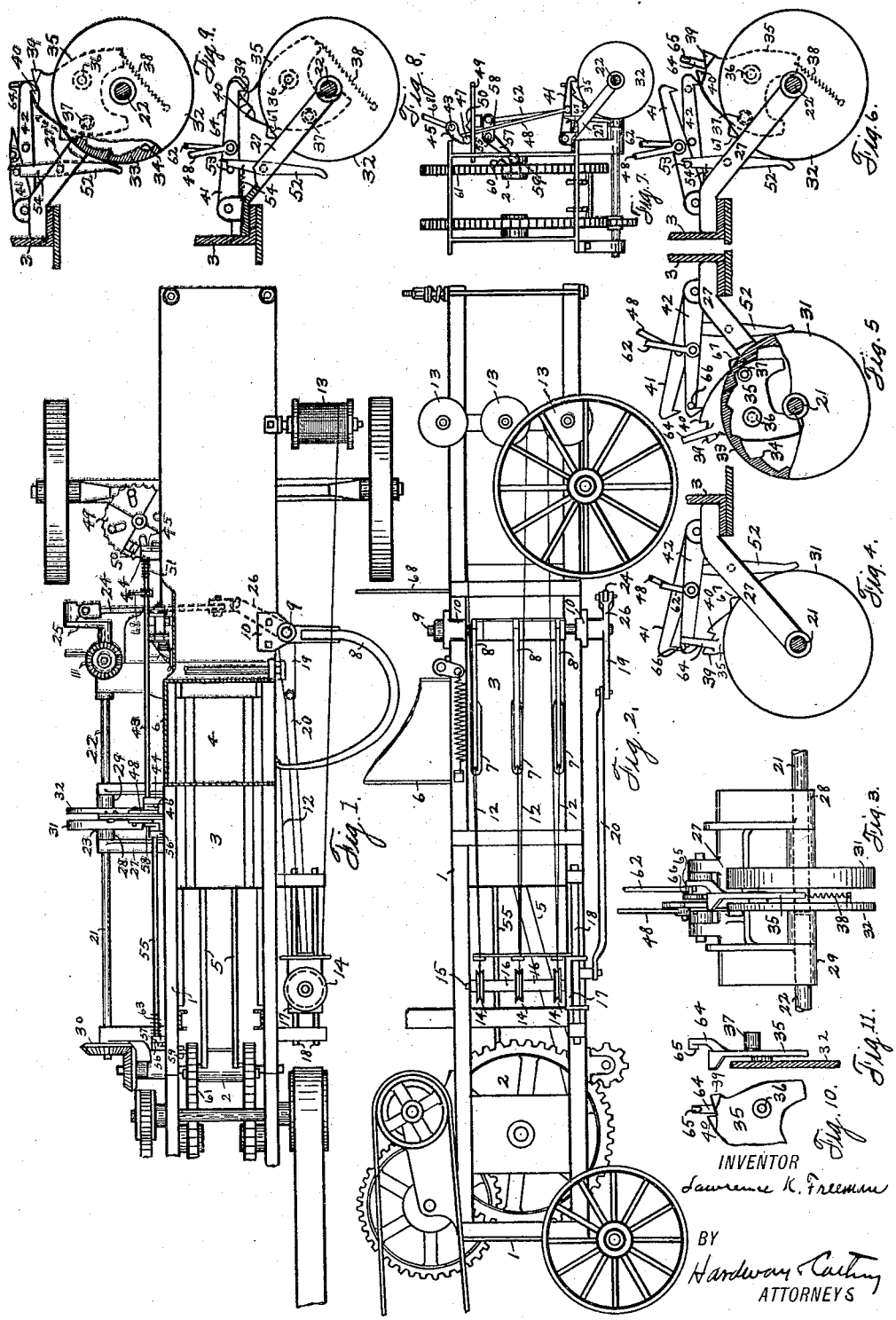

UNITED STATES PATENT OFFICE.

LAWRENCE K. FREEMAN, OF BELLAIRE, TEXAS.

BALE-FORMING MACHINE.

1,277,302.   Specification of Letters Patent.   Patented Aug. 27, 1918.

Application filed February 1, 1917.   Serial No. 145,948.

*To all whom it may concern:*

Be it known that I, LAWRENCE K. FREEMAN, a citizen of the United States, residing at Bellaire, in the county of Harris and State of Texas, have invented certain new and useful Improvements in Bale-Forming Machines, of which the following is a specification.

This invention relates to new and useful improvements in a bale forming machine.

The object of the invention is to provide a machine of the character described for forming, and automatically securing wires around, bales of hay and other like material, and has for its special object the provision of an improved form of clutch for connecting the wire twisters and needles with, and disconnecting them from, a driving means.

Another object of the invention is to provide a clutch, of the character described, which will permit the plunger, in the baling chamber, to perform a predetermined number of strokes, after the completion of the bale to be tied, before it operatively connects the driving means with the wire securing mechanism.

Another feature of the invention resides in the provision of a machine of the character described that will be simple in construction and that will operate easily, positively and automatically.

With the above and other objects in view, the invention has particular relation to certain novel features of construction, operation and arrangement of parts, an example of which is given in this specification and illustrated in the accompanying drawings, wherein:—

Figure 1 is a plan view of the machine.

Fig. 2 is a side view thereof.

Fig. 3 is a side view of the clutch employed.

Fig. 4 is an end elevation thereof.

Fig. 5 is an end elevation thereof partially in section.

Fig. 6 is an end elevation showing the reverse view from that shown in Fig. 4.

Fig. 7 shows a front view of the plunger driving mechanism, and the clutch in relation thereto.

Fig. 8 shows an end view of the clutch in idle, or disengaged position.

Fig. 9 shows an end view thereof, partially in section, showing the members in position to engage upon the next revolution of the plunger driving mechanism.

Fig. 10 shows a fragmentary end elevation of the clutch, and

Fig. 11 shows a fragmentary sectional view thereof.

Referring now more particularly to the drawings wherein like numerals of reference designate similar parts in each of the figures, the numeral 1 refers to the frame work of the press which is composed of suitable side and end members and in general contour is of the ordinary and well known form. At one end of the frame work is mounted the driving mechanism indicated by the numeral 2 and being of the usual construction it is not deemed to be necessary to describe the same in detail. The numeral 3 refers to the baling chamber which is supported by the frame work and which has the plunger 4 reciprocating therein, actuated through the connecting rods 5 in the well known manner. The baling chamber receives the material to be compressed through the hopper 6 which is mounted thereon and said chamber has the side slots 7, 7, 7, in each side thereof through which the corresponding needles 8, 8, 8, pass. These needles are fixed on the vertical shaft 9 rotatably mounted in suitable bearings 10, 10, which are fixed to the side of the baling chamber. Fixed to the opposite side of said chamber are wire twisting devices as 11, in alinement with and coöperating with the respective needles to secure the wires 12, 12, 12, around the bale in the usual manner. These wires are stored on storage spools 13, 13, 13, and pass around the sheaves 14, 14, 14, thence through the needle eyes, their free ends passing through the side slots 7, 7, 7, and being attached to the corresponding twisters 11. The sheaves 14 are loosely mounted upon a vertical rod 15 and are held spaced apart thereon by means of the sleeves 16, 16, said rod being secured to a platform 17 which is slidably mounted upon a stationary track 18. The lower end of the shaft 9 has an arm 19 fixed thereto and a link 20 is pivoted at one end to the free end of said arm and at the other end to the said platform. When the needles are driven through the chamber to carry the securing wires around the bale and into coöperation with the twisters, the arm 19 swings around and operates through the link 20 to pull the platform 17, and the sheaves 14 mounted thereon toward the needles thus providing a certain amount of slack in said wires so as to prevent too sudden a pull against the wires by the needles, thus obviating the liability of breaking the wires or spinning the storage spools 13 and thereby unwinding too much wire from them. When the needles are withdrawn from the baling chamber, the arm 19 operates through the link 20 to force said sheaves in the opposite direction and gradually unwind the wire from the storage spools. The twisters are driven from the driving mechanism 2 through the shafts 21 and 22, which may be operatively connected to and disconnected from the clutch mechanism 23 and the needles are driven by means of the connecting link 24, one end of which is pivoted to the crank 25 carried by the shaft 22 and the other end of which is pivoted to the free end of the arm 26 which is fixed to the lower end of the vertical needle shaft 9.

The clutch frame 27 is fixed to the side of the baling chamber 3 and has the bearings 28 and 29 which receive the adjacent ends of the independent driving and driven shafts 21 and 22. The shaft 21 has a bevel pinion 30 fixed thereon through which it is driven from the driving mechanism 2 and the adjacent ends of said shafts have the driving and driven members 31 and 32, respectively, fixed thereon, which are clutched together and declutched as hereinafter described. The driving member has an annular rim 33 whose inner side has a plurality of sloping shoulders 34, spaced apart therearound, and the driven member has a clutch latch 35, approximately arcuate in form and which is pivoted eccentrically to said member at the point 36. The side of the latch facing the driving member 31 has a projecting roller 37 and a pull spring 38 is attached at one end to the driven member 32 and at its other end to the end of said latch opposite the roller and which tends to lock said latch end against the shaft 21 and carry said roller into engagement with one of the shoulders 34, thus clutching the driven and driving members together, as shown in Fig. 5. The periphery of the latch 35 has a plurality of ratchet teeth, as 39 and 40, spaced apart and two latch hooks 41 and 42 are pivoted to the side of the baling chamber, provided to engage with the teeth and when so engaged to hold the members 31 and 32 out of engagement, as shown in Figs. 8 and 9.

A shaft 43 is rotatably mounted in the bearings 44, 44, the ends of said shaft having the arms 45 and 46, respectively fixed thereto the free end of the former of which has the roller bearing 47 and the free end of the latter of which is pivoted to the upper end of the link 48; the other end of said link being pivoted to the latch 41. A measuring wheel 49 is rotatably mounted, and has its margin serrated, to engage with and be rotated by the bales passing from the baling chamber. The upper face of this wheel has a cam 50 which contacts with the bearing 47, as the wheel rotates, and partially rotates the shaft 43, overcoming the influence of the torsional spring 51, attached to said shaft. This partial rotation of said shaft occurs at the completion of the bale being formed, and operates, through the arm 46 and link 48, to lift the hook 41 out of contact with the ratchet tooth 39. Pivoted to the bearing 27 is a latch 52 whose upper end has a shoulder to engage underneath the pin 53, projecting from the side of the hook 41. A pull spring 54 is attached at one end to the side of the frame 27 and at its other end to the upper end of the latch 52 and when the hook 41 is lifted the shoulder of the latch 52 engages under said pin and holds the hook elevated and out of engagement with said ratchet teeth as shown in Figs. 6 and 9.

A shaft 55 is rotatably mounted in bearings 56, 56, the ends of said shaft having the arms 57 and 58 fixed to the respective ends thereof. The free end of the arm 57 has a roller bearing 59 arranged in the path of the cam 60 carried by the outer face of the gear wheel 61; and the free end of the arm 58 is pivoted to one end of the link 62. The other end of this link is pivoted to the hook 42, and with each rotation of the gear wheel 61, and each stroke of the plunger, the cam 60 operates through the arm 57 to partially rotate the shaft 55 overcoming the influence of the torsional spring 63, attached to said shaft and lifting said hook 42. During the formation of the bale, the hook 42 plays idly, being lifted with each forward stroke of the plunger by the cam 60, and lowered by the influence of the spring 63, when said cam has passed the bearing 59. However, until the bale is completed the hook 41 is in constant engagement with the tooth 39 and prevents the engagement of the clutch members. Upon the completion of the bale the hook 41 is lifted as explained and then upon the next forward stroke of the plunger the hook 42 will also be lifted and the clutch latch 35 will be released to the pull of the spring 38. The hook 42, however, will be immediately lowered by the spring 63 and said hook will engage the tooth 40 and prevent the driving member 31 from clutching with the driven member 32. In order to insure this engagement, an arm 64 has been provided which projects up from the latch 35 and has the lateral stud 65 in line with a similar stud 66 projecting laterally from the hook 42. The downward pull of the spring 63 exerted against the hook 42 causes the stud 66 to pass under the stud 65 and before the former has cleared the latter, said hook 42 will be in position to engage with the tooth 40. Upon the next forward stroke of the plunger the hook 42 will be again lifted as above explained and the latch 35 will be freed to the pull of the spring 38 and roller 37 will be carried outwardly into the path of the shoulders 34 and will be engaged by one of said shoulders, thus clutching the driven member 32 with the driving member 31 and imparting rotation to the driven shaft 22. From the foregoing, it is obvious that after the completion of a bale and the release of the hook 41, it will require two rotations of the gear wheel 61, (permitting two strokes of the plunger) to release the hook 42 from the ratchet teeth 39 and 40 successively, thus permitting the plunger to clear the chamber of all loose hay, and permitting the tucker to bring the loose ends of the hay within the range of the tying wires, before said wires are carried around the bale end and tied by the twisters.

As the driven member rotates it carries the cam 67, projecting from the periphery thereof, against the lower end of the latch 52, releasing the upper end thereof from the pin 53, and thus releasing the hook 41 to the influence of the torsional spring 51 which operates to lower said hook into the path of the tooth 39. Upon the completion of one rotation of the driven member, said tooth will engage with said hook 41 withdrawing roller 37 of the clutch latch from engagement with the driving member and operating to declutch the driven shaft 22 and the twisters from the driving shaft.

In case it is desired the measuring wheel 49 may be eliminated and the shaft 43 manipulated through the manual lever 68, which is fixed to said shaft, upon the completion of the bale. Otherwise the operation of the machine will be as hereinbefore explained.

What I claim is:

1. A device of the character described including a baling chamber wherein bales are formed, a plunger, a plunger driving mechanism, a wire twister, means for operating the twister, a clutch for connecting said mechanism and operating means, a disengaging member normally in position to disengage said clutch, said member being released by the moving bale, from its operative connection with said clutch, and means actuated by the driving mechanism temporarily suspending the clutch engagement after said member has been released.

2. A device of the character described including a chamber wherein bales are formed, a plunger, a plunger driving mechanism, a wire twister, twister operating means, a clutch for connecting said mechanism and means, and clutch disengaging means released from operative connection with the clutch, respectively, by the moving bale and the driving mechanism.

3. A device of the character described including a chamber wherein bales are formed, a plunger, a plunger driving mechanism, a wire twister, twister operating means, a clutch for connecting said mechanism and means, and means normally disconnecting said clutch, said means being released, respectively, from operative connection with the clutch, by the moving bale and the driving mechanism.

4. A device of the character described including a chamber wherein bales are formed, a plunger, a plunger driving mechanism, a wire twister, twister operating means, a clutch for connecting said mechanism and means, means operating successively to disconnect the clutch, and being actuated by the moving bale and the driving mechanism, respectively, out of operative connection with said clutch.

5. A device of the character described including a compress chamber, a compressing mechanism, a twister, a twister operating means, a clutch for connecting and disconnecting said mechanism and means, a clutch latch having a plurality of shoulders and mounted upon the driven member of said clutch and arranged to lock said driven member to and cause the same to rotate with the driving member of said clutch, a hook arranged to engage against one of the shoulders on said latch and hold the same in a disengaged position, and means for releasing said hook and means actuated by the compressing mechanism and temporarily suspending the connection of said clutch members as said hook has been released.

6. A device of the character described including a compress chamber, a mechanism for compressing material therein, a twister, a twister operating means, a clutch for connecting said mechanism and means, a clutch latch having a plurality of shoulders and being mounted upon the driven member on the clutch and arranged to connect said member to and cause the same to rotate with the driving member of the clutch, a hook arranged to engage against one of the shoulders of the said latch and hold the same in a disengaged position, means controlled by the compressed material for releasing said hook, and means actuated by the compressing mechanism and engaging with the other shoulder of said latch and temporarily suspend the connection of said clutch members after said hook has been released.

7. A device of the character described including a compress chamber, a mechanism for compressing material therein, a twister, a twister operating means, a clutch for connecting said mechanism and means, a clutch latch having a plurality of shoulders thereon and being mounted on the driven member of said clutch and arranged to lock said driven member to and cause the same to rotate with the driving member of the clutch, a hook arranged to engage with one of the shoulders of said latch and normally hold the same in a disengaged position, means for releasing said hook, and means actuated by the compressing mechanism and successively engaging said shoulders on said latch and temporarily suspending the connection of said clutch after said hook has been released.

8. A device of the character described including a compress chamber, a mechanism for compressing material therein, a twister, a twister operating means, a clutch for connecting said mechanism and means, a clutch latch having a plurality of shoulders thereon and being mounted on the driven member of said clutch and arranged to lock said driven member to and cause the same to rotate with the driving member of the clutch, a hook arranged to engage with one of the shoulders of said latch and normally hold the same in a disengaged position, means controlled by the compressed material for releasing said hook, and means actuated by the compressing mechanism and successively engaging said shoulders on said latch and temporarily suspending the connection of said clutch after said hook has been released.

In testimony whereof I have signed my name to this specification in the presence of two subscribing witnesses.

LAWRENCE K. FREEMAN.

Witnesses:
A. S. GRANT,
WM. A. GRANT.

Copies of this patent may be obtained for five cents each, by addressing the "Commissioner of Patents, Washington, D. C."